US011933077B2

(12) United States Patent
Su

(10) Patent No.: US 11,933,077 B2
(45) Date of Patent: Mar. 19, 2024

(54) COMBINATION LOCK FOR ELECTRONIC DEVICES

(71) Applicant: Jason Su, Changhua (TW)

(72) Inventor: Jason Su, Changhua (TW)

( * ) Notice: Subject to any disclaimer, the term of this patent is extended or adjusted under 35 U.S.C. 154(b) by 390 days.

(21) Appl. No.: 17/472,671

(22) Filed: Sep. 12, 2021

(65) Prior Publication Data

US 2023/0079422 A1 Mar. 16, 2023

(51) Int. Cl.
*E05B 73/00* (2006.01)

(52) U.S. Cl.
CPC ...... *E05B 73/0005* (2013.01); *E05B 73/0082* (2013.01)

(58) Field of Classification Search
CPC .. E05B 73/0005; E05B 73/0082; E05B 73/00; E05B 9/10; E05B 17/04; E05B 69/00; E05B 13/02
USPC ............... 70/379 R, 14, 379 A, 58, 424, 428
See application file for complete search history.

(56) References Cited

U.S. PATENT DOCUMENTS 1,785,518 A * 12/1930 Higgins ................... H01B 7/06 267/74
8,695,384 B2 * 4/2014 Yu ....................... E05B 73/0005 70/424
2012/0312056 A1 * 12/2012 Yu ....................... E05B 73/0082 70/14
2014/0026625 A1 * 1/2014 Wu ..................... E05B 73/0082 70/14
2014/0069153 A1 * 3/2014 Wu ..................... E05B 73/0082 70/58

* cited by examiner

*Primary Examiner* — Michael P Ferguson
*Assistant Examiner* — Thomas L Neubauer
(74) *Attorney, Agent, or Firm* — Che-Yang Chen; Law Office of Michael Chen

(57) ABSTRACT

A combination lock for electronic devices may include a main body, a digit lock core, a key lock core, a control unit, a driving block, a switching unit, and two engaging units. The combination lock can be locked/unlocked through the digit lock core and the key lock core, and also when the combination lock is locked on the electronic device, the main body can be axially rotated to enable a digit wheel of the digit lock core to be faced to the designated direction.

7 Claims, 9 Drawing Sheets

A-A

COMBINATION LOCK FOR ELECTRONIC DEVICES

FIELD OF THE INVENTION

The present invention relates to a lock for electronic devices and more particularly to a combination lock having both of the digit lock core and the key lock core.

BACKGROUND OF THE INVENTION

Nowadays, it is common to see 3C products such as desktop computers and laptops which are used for education or other purposes and placed in computer classrooms, libraries, offices, shopping malls or other public places. However, because of small volume, the 3C products, especially laptops, are easily to be moved or stolen. Thus, the 3C products always are locked through a lock.

The common lock for electronic devices comprises a key lock core to realize locking purpose, but it will be trouble when the user loses the key incautiously. Thus, in order to prevent this situation, the combination lock is appeared on the market that the user does not need the key to achieve the locked and unlocked effects.

However, the conventional combination lock for electronic devices has following disadvantages: (i) the user still has chance to forget the password of the combination lock, leading to the trouble of unlocking process; and (ii) there are so many types of electronic devices with different designs of lock holes, such that even the locked effect could be achieved with the same locking approach by engaging the lock arm of the combination lock with the lock hole of the electronic device, the wheel of the combination lock may face different directions, making it difficult for the user to operation. Therefore, there remains a need for a new and improved design for a combination lock for electronic devices to overcome the problems presented above.

SUMMARY OF THE INVENTION

The present invention provides a combination lock for electronic devices comprising a main body, a digit lock core, a key lock core, a control unit, a driving block, a switching unit, and two engaging units. The main body has two halves of shells to fit together, and the digit lock core and the key lock core are installed in the shells of the main body. A first slot is formed in the upper portion of the shells at the position corresponding to the digit lock core while a second slot is formed in the upper portion of the shells at the position corresponding to the key lock core, and the first slot and the second slot are communicated through a corner portion. The corner portion comprises a blocking edge adjacent to a lateral side of the second slot, and a locating block protrudes from an interior space of the corner portion. The first slot is adapted to laterally penetrate through the shells through an operating opening, and a spherical first housing is formed at the upper end of the first slot, and as the control unit is coupled in the main body, a top rod of the control unit is configured to upwardly protrude from the first housing. A first through hole is formed at a lower portion of the shells, and a key of the key lock core is configured to be inserted into the shells through the first through hole, and a lock cable is connected to one end of the shells. The digit lock core has a lock pin which is adapted to keep pressed into the first slot when not operated, and a digit wheel is disposed on the digit lock core so as to control the lock pin. When the code of the digit wheel matches the preset code of the digit wheel, the lock pin is adapted to be driven downwardly into the unlocked position. The upper end of the lock pin comprises an abutting board having a larger diameter than the lock pin.

The key lock core has a lock rod which is configured to keep pressed into the second slot when not operated, and the lock rod is locked/unlocked through the key. When unlocked by the key, the lock rod is adapted to be driven downwardly into the unlocked position. The control unit has a board body, and a top rod is extended from the board body, and one edge of the board body is connected to a push button. The control unit is positioned into the first slot of the shells, and the push button and the top rod are adapted to protrude from the operating opening and the first housing respectively. A first spring abutted between the first slot and the control unit is configured to keep pushing the control unit upwardly in normal condition. An extending section formed at the upper portion of the driving block has a smaller diameter than that of the driving block, and the driving block is positioned into the second slot in the two shells so as to connect to the lock rod of the key lock core. When the key lock core is locked, the lock rod is protruded to drive the extending section of the driving block into the corner portion of the shells. The switching unit comprises a connecting channel at the central portion thereof, and the switching unit is disposed on the locating block through the connecting channel. A second spring is adapted to be abutted between the inner wall of the locating block and the inner wall of the connecting channel so that the second spring is configured to keep pushing the switching unit laterally in normal condition. The switching unit is configured to abut against the extending section in the corner portion so as to limit the position of the switching unit. A sliding slot is formed at a lateral side of the switching unit, and a sliding block is adapted to slidably couple with the sliding slot, and a third spring is abutted between the sliding block and the sliding slot. The sliding block is positioned between the abutting board and the control unit.

The two engaging units are two halves to fit together, and each of the engaging units has a hemi-spherical portion at a lower end thereof, and the two hemi-spherical portions are put together and positioned in the first housing of the main body, and the top rod having a tapered top is positioned between the two hemi-spherical portions. Each of the engaging units comprises a second housing, and the second housings are adapted to accommodate the top rod when the top rod is not pushed, and the two engaging units are configured to fit together when the top rod is not pushed upwardly. A first annular groove is formed on the inner surface of the first housing, and each of the engaging units has at least a sliding column protruding from the hemi-spherical portion, and the sliding column is adapted to slidably move in the first annular groove so as to limit the relative position between the engaging units and the main body. Each of the engaging units comprises an engaging arm at the top portion thereof, and the engaging arms are configured to protrude out of the main body. A second annular groove is formed on the surface of the main body adjacent to the opening of the first housing, and a round cover is coupled with the second annular groove. The round cover has a second through hole to allow the engaging arms to penetrate therethrough, so that, through the second annular groove, the main body is adapted to rotate relative to the round cover. When the top rod is pushed upwardly, the two engaging arms are configured to be driven and spread apart so as to achieve the locked effect.

Comparing with conventional combination lock for electronic devices, the present invention is advantageous because: (i) in case of forgetting the preset code of the digit wheel, the user still can use the key to unlock the key lock core; and (ii) even when the combination lock is locked on the electronic device, with the design between the hemi-spherical portions of the engaging units and the spherical first housing of the main body, the hemi-spherical portions and the first housing can have relative movement, so that the main body can have synchronous rotation along the same axis of the hemi-spherical portions, and the digit wheel can be faced to the designated direction.

DETAILED DESCRIPTION OF THE INVENTION

Figure 1:
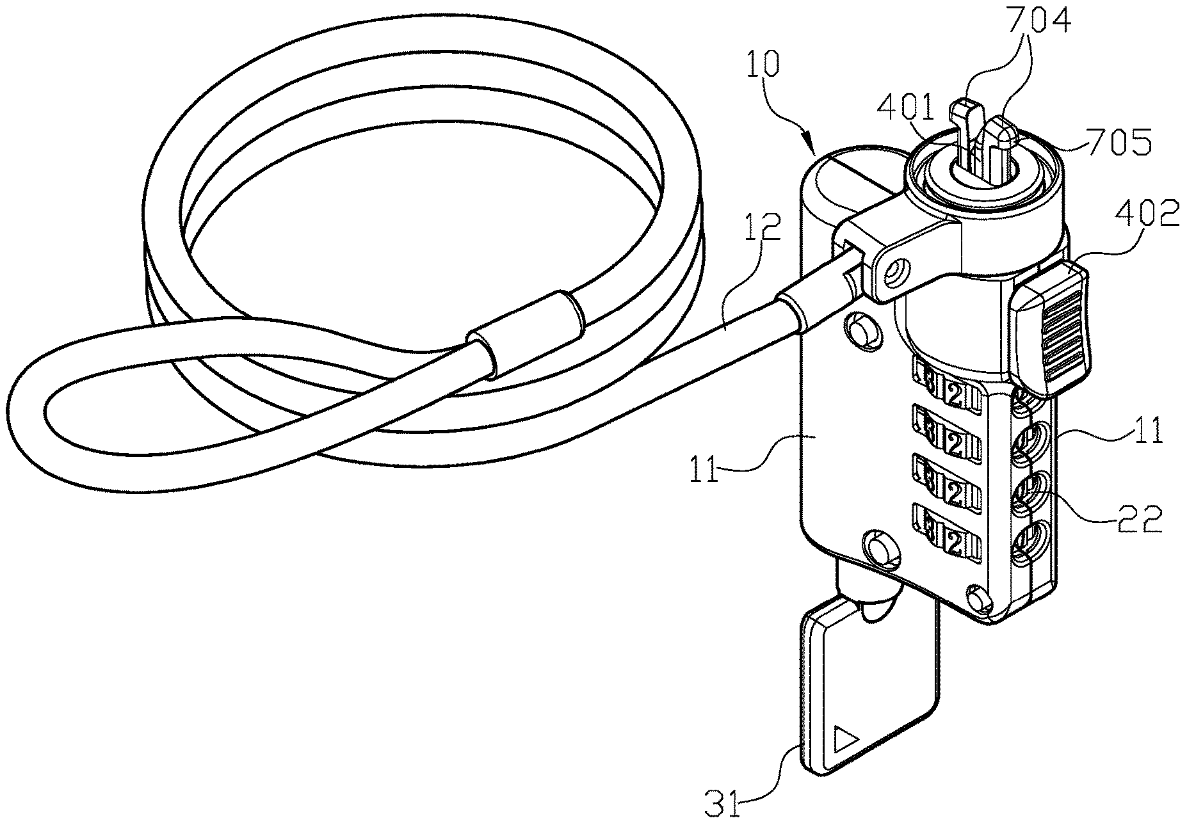
FIG. 1 is a three-dimensional assembly view of a combination lock for electronic devices of the present invention.
Figure 2:
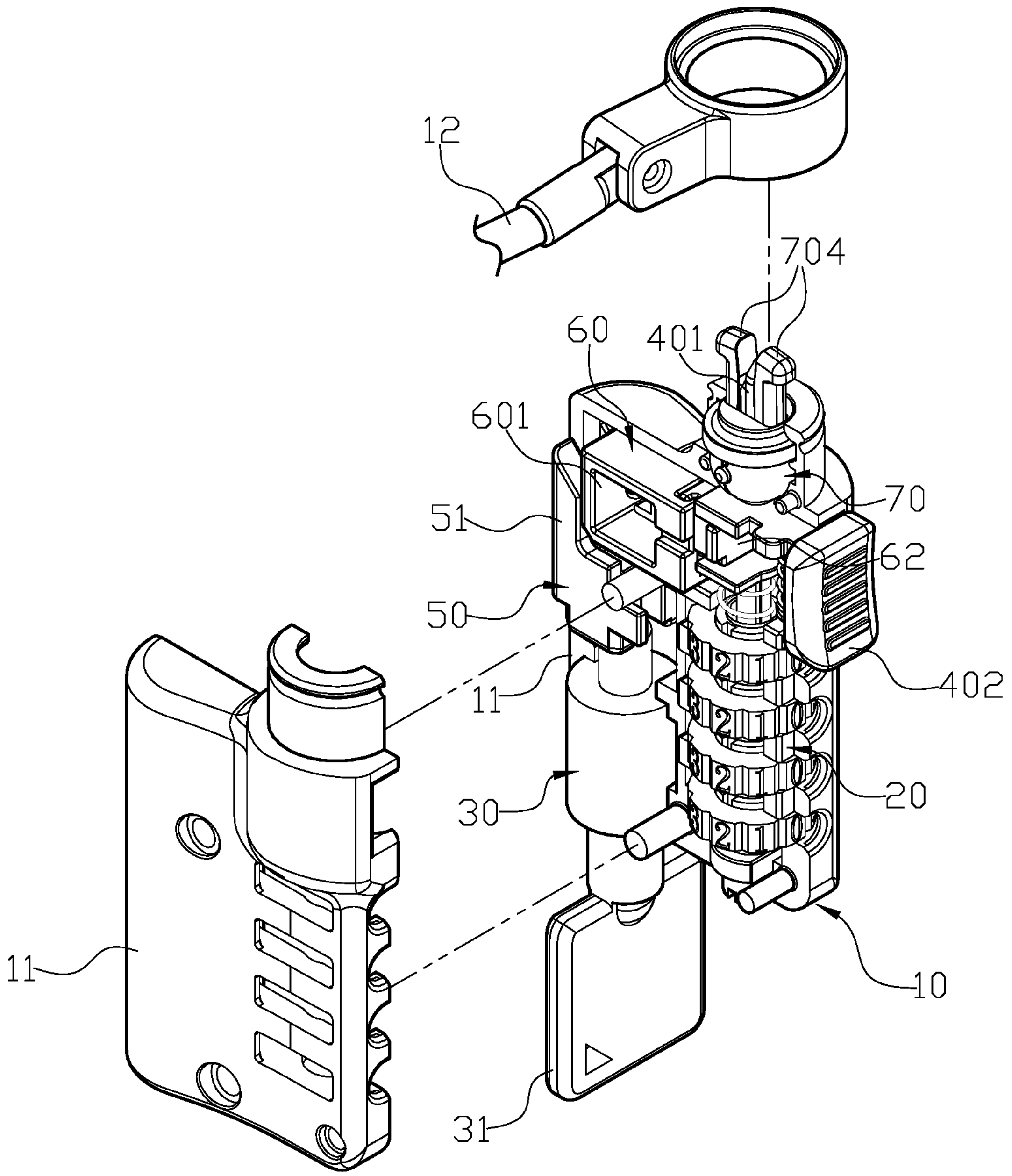
FIG. 2 is a three-dimensional exploded view of the combination lock of the present invention.
Figure 3:
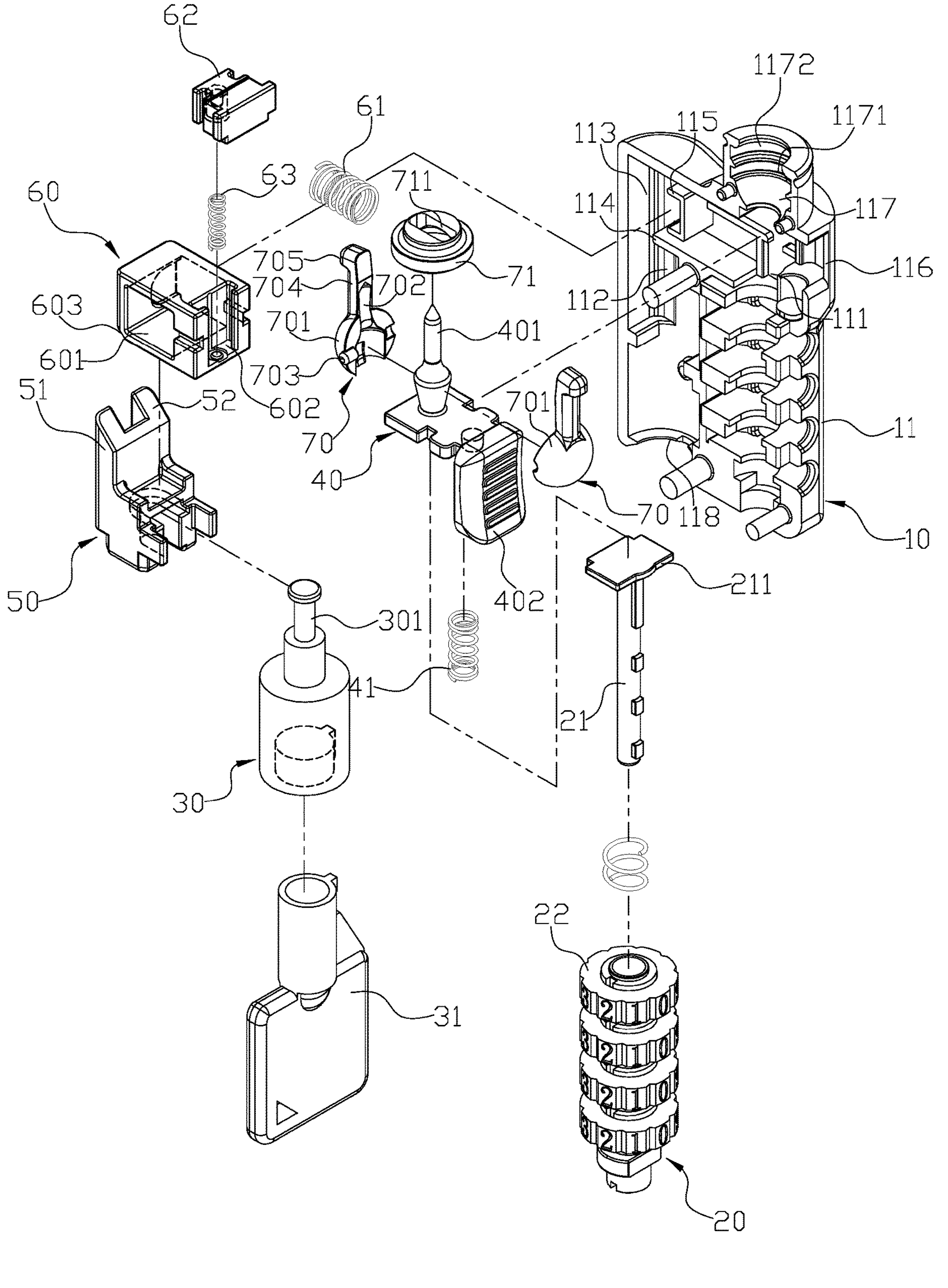
FIG. 3 is a detailed exploded view of the combination lock of the present invention.
Figure 4:
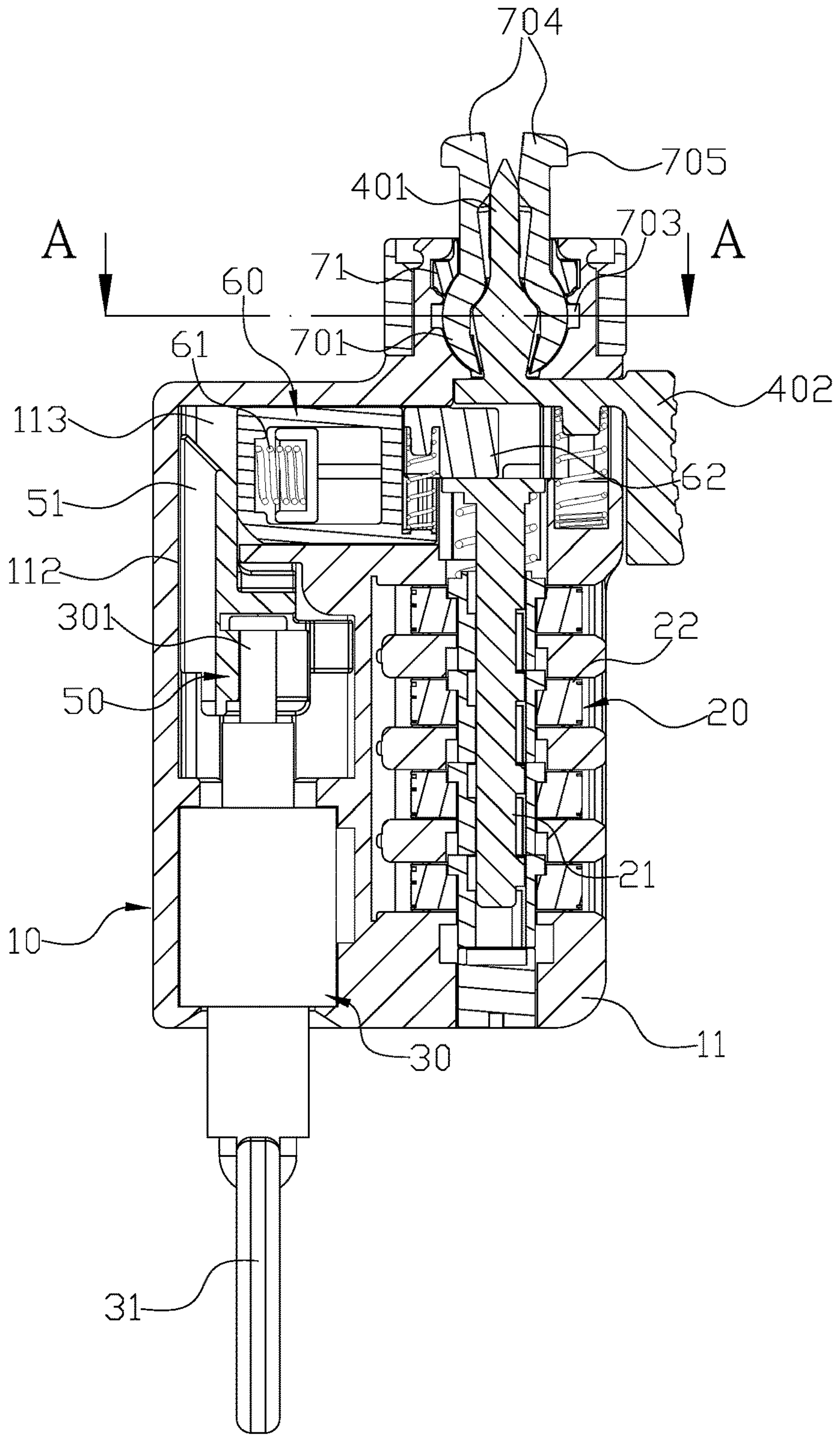
FIG. 4 is a sectional assembly view of the combination lock of the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 5, the present invention provides a combination lock for electronic devices comprising a main body (10), a digit lock core (20), a key lock core (30), a control unit (40), a driving block (50), a switching unit (60), and two engaging units (70). The main body (10) has two halves of shells (11) to fit together, and the digit lock core (20) and the key lock core (30) are installed in the shells (11) of the main body (10). A first slot (111) is formed in the upper portion of the shells (11) at the position corresponding to the digit lock core (20) while a second slot (112) is formed in the upper portion of the shells (11) at the position corresponding to the key lock core (30), and the first slot (111) and the second slot (112) are communicated through a corner portion (113). Moreover, the corner portion (113) comprises a blocking edge (114) adjacent to a lateral side of the second slot (112), and a locating block (115) protrudes from an interior space of the corner portion (113). The first slot (111) is adapted to laterally penetrate through the shells (11) through an operating opening (116), and a spherical first housing (117) is formed at the upper end of the first slot (111), and as the control unit (40) is coupled in the main body (10), a top rod (401) of the control unit (40) is configured to upwardly protrude from the first housing (117). Also, a first through hole (118) is formed at a lower portion of the shells (11), and a key (31) of the key lock core (30) is adapted to be inserted into the shells (11) through the first through hole (118), and a lock cable (12) is connected to one end of the shells (11). The digit lock core (20) has a lock pin (21) which is adapted to keep pressed into the first slot (111) when not operated, and a digit wheel (22) is disposed on the digit lock core (20) so as to control the lock pin (21). When the code of the digit wheel (22) matches the preset code of the digit wheel (22), the lock pin (21) is adapted to be driven downwardly into the unlocked position. Moreover, the upper end of the lock pin (21) comprises an abutting board (211) having a larger diameter than the lock pin (21). The key lock core (30) has a lock rod (301) which is configured to keep pressed into the second slot (112) when not operated, and the lock rod (301) is locked and unlocked through the key (31). When unlocked by the key (31), the lock rod (301) is adapted to be driven downwardly into the unlocked position. The control unit (40) has a board body, and a top rod (401) is extended from the board body, and one edge of the board body is connected to a push button (402). The control unit (40) is positioned into the first slot (111) of the shells (11), and the push button (402) and the top rod (401) are adapted to protrude from the operating opening (116) and the first housing (117) respectively. In addition, a first spring (41) abutted between the first slot (111) and the control unit (40) is configured to keep pushing the control unit (40) upwardly in normal condition. An extending section (51) formed at the upper portion of the driving block (50) has a smaller diameter than that of the driving block (50), and the driving block (50) is positioned into the second slot (112) in the two shells (11) so as to connect to the lock rod (301) of the key lock core (30). When the key lock core (30) is locked, the lock rod (301) is protruded to drive the extending section (51) of the driving block (50) into the corner portion (113) of the shells (11). The switching unit (60) comprises a connecting channel (601) at the central portion thereof, and the switching unit (60) is disposed on the locating block (115) through the connecting channel (601). A second spring (61) is adapted to be abutted between the inner wall of the locating block (115) and the inner wall of the connecting channel (601) so that the second spring (61) is configured to keep pushing the switching unit (60) laterally in normal condition. The switching unit (60) is configured to abut against the extending section (51) in the corner portion (113) so as to limit the position of the switching unit (60). Also, a sliding slot (602) is formed at a lateral side of the switching unit (60), and a sliding block (62) is adapted to slidably couple with the sliding slot (602), and a third spring (63) is abutted between the sliding block (62) and the sliding slot (602). The sliding block (62) is positioned between the abutting board (211) and the control unit (40). The two engaging units (70) are two halves to fit together, and each of the engaging units (70) has a hemi-spherical portion (701) at a lower end thereof, and the two hemi-spherical portions (701) are put together and positioned in the first housing (117) of the main body (10), and the top rod (401) is positioned between the two hemi-spherical portions (701), and the top rod (401) has a tapered top. Furthermore, each of the engaging units (70) comprises a second housing (702), and the second housings (702) are adapted to accommodate the top rod (401) when not pushed, and the two engaging units (70) are configured to fit together when the top rod (401) is not pushed upwardly. Additionally, a first annular groove (1171) is formed on the inner surface of the first housing (117), and each of the engaging units (70) has at least a sliding column (703) protruding from the hemi-spherical portion (701), and the sliding column (703) is adapted to slidably move in the first annular groove (1171) so as to limit the relative position between the engaging units (70) and the main body (10). Moreover, each of the engaging units (70) comprises an engaging arm (704) at the top portion thereof, and the engaging arms (704) are configured to protrude out of the main body (10). In addition, a second annular groove (1172) is formed on the surface of the main body (10) adjacent to the opening of the first housing (117), and a round cover (71) is coupled with the second annular groove (1172). Also, the round cover (71) has a second through hole (711) to allow the engaging arms (704) to penetrate therethrough, so that, through the second annular groove (1172), the main body (10) is adapted to rotate relative to the round cover (71). When the top rod (401) is pushed upwardly, the two engaging arms (704) are configured to be driven and spread apart so as to achieve the locked effect.

Figure 5:
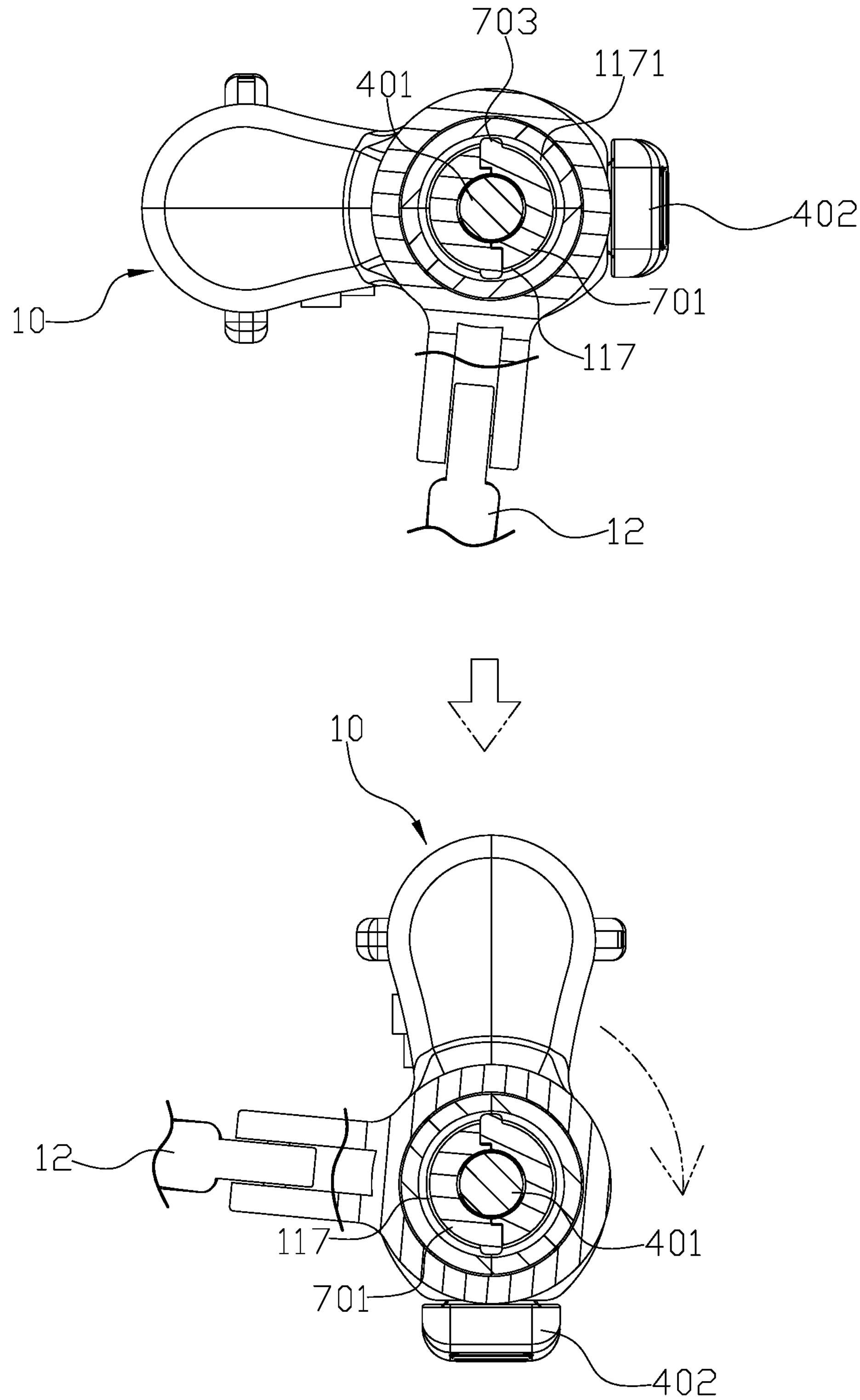
FIG. 5 is a schematic view illustrating the rotation of a main body of the combination lock in the present invention.
Figure 6:
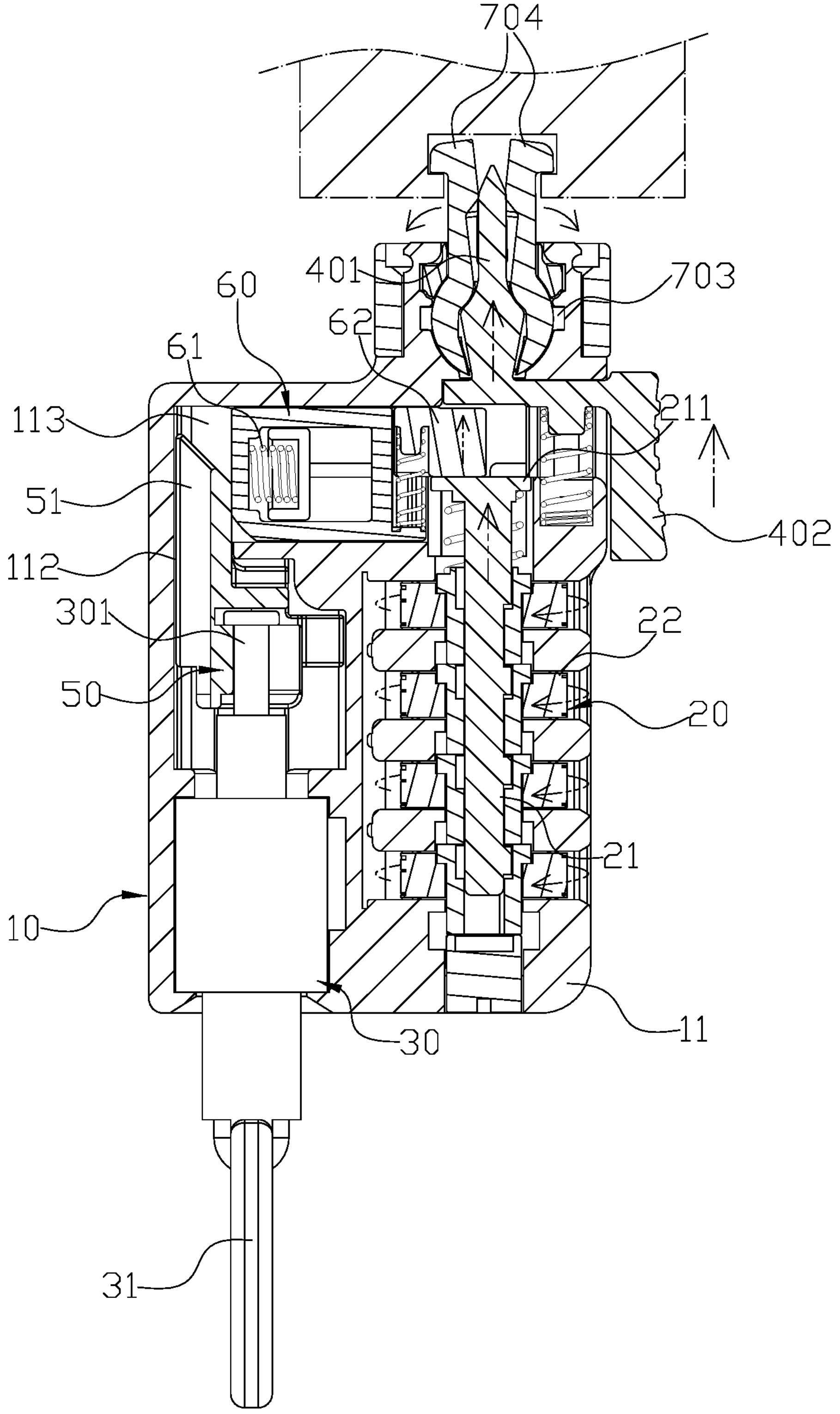
FIG. 6 is a schematic view illustrating the combination lock of the present invention is locked.
Figure 7:
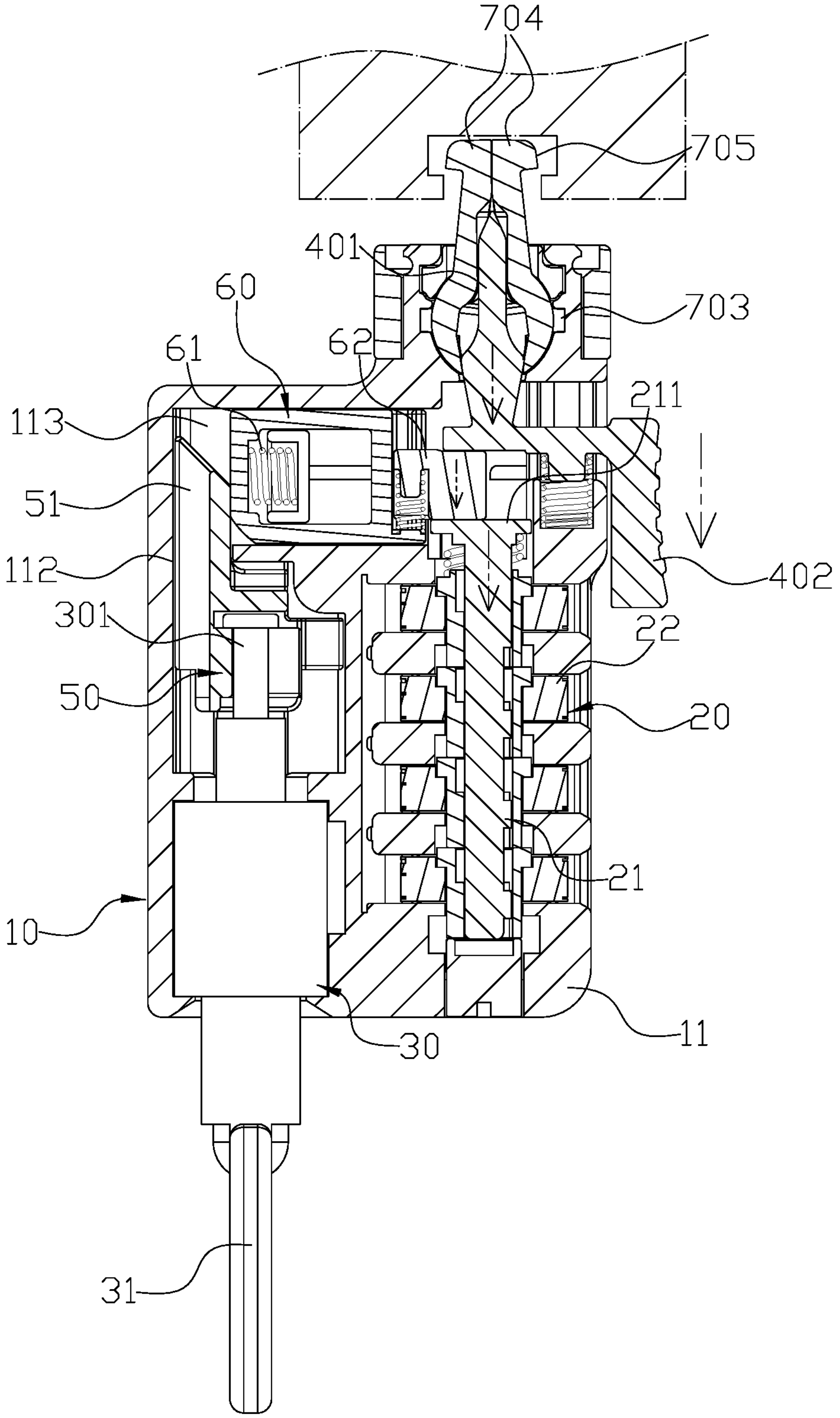
FIG. 7 is a schematic view illustrating the combination lock of the present invention is unlocked through a digit lock core thereof.
Figure 8:
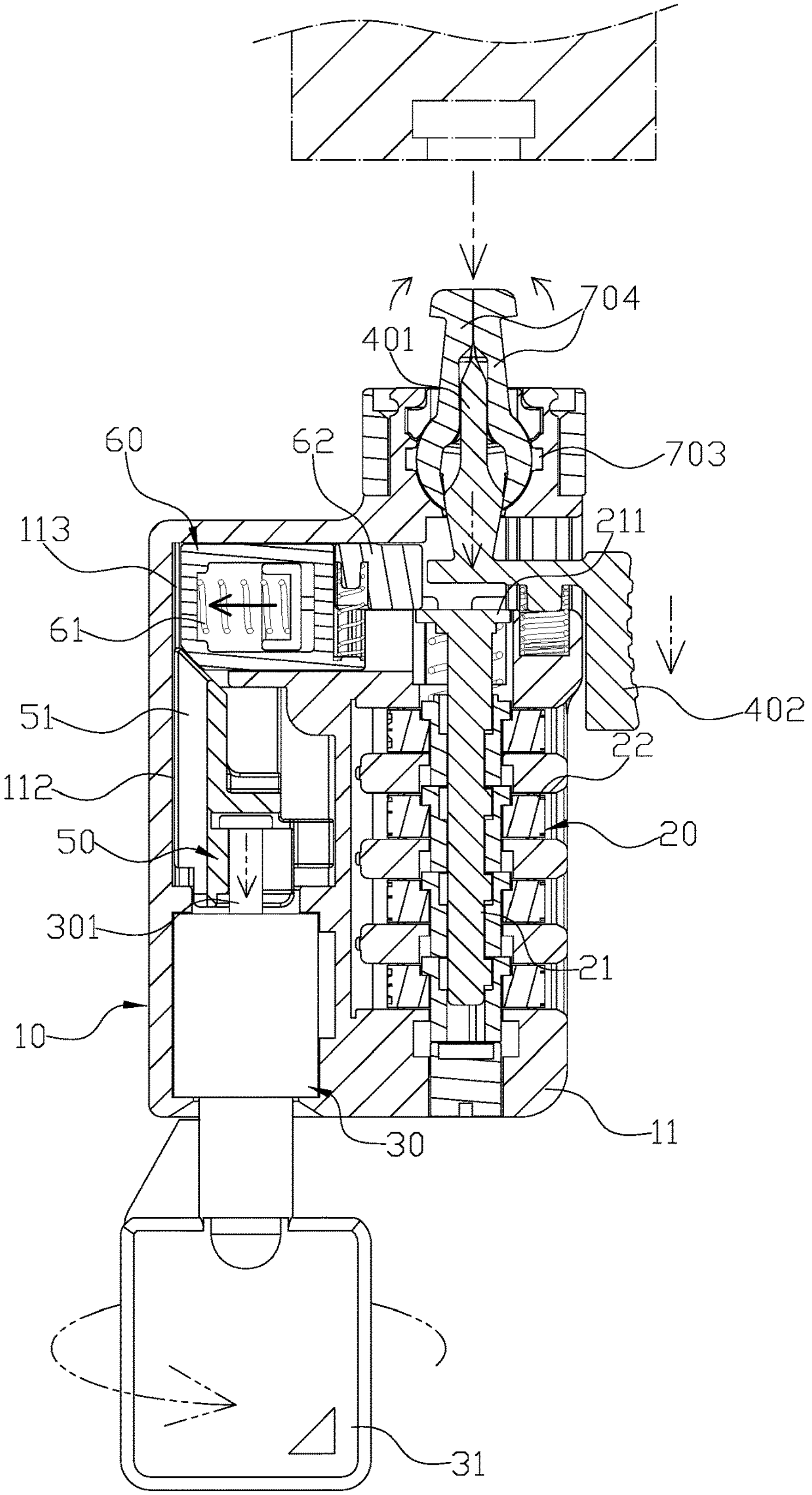
FIG. 8 is a schematic view illustrating the combination lock of the present invention is unlocked through a key lock core thereof.

In actual application, the top rod (401) is driven by the push button (402), and the two engaging arms (704) are pushed apart, and the engaging arms (704) are adapted to engage with the lock hole of the electronic device such as laptop and tablet to achieve the locked effect (as shown in FIG. 6). When the combination lock of the present invention needs to be unlocked, the user can rotate the digit wheel (22) and match the preset code of the digit wheel (22), and the control unit (40) is configured to drive and pull the top rod (401) downwardly (as shown in FIG. 7), so as to unlock the combination lock of the present invention. In case of forgetting the code of the digit wheel (22), the user can use the key (31) to drive and pull the lock rod (301) together with the driving block (50) downwardly, so that the extending section (51) is pulled out from the corner portion (113) and is moved into the second slot (112). Meanwhile, as the compressed second spring (61) is released, the switching unit (60) is configured to move into the corner portion (113) and to drive the sliding block (62) out of the position between the abutting board (211) and the control unit (40). Thus, although the digit lock core (20) is not unlocked, with shifting the position of the sliding block (62), the push button (402) is adapted to drive the top rod (401) downwardly, so as to unlock the combination lock of the present invention (as shown in FIG. 8). Additionally, the engaging units (70) are slidably positioned in the first housing (117) of the main body (10) through the hemi-spherical portions (701), and the top rod (401) is also not blocked when positioned between the two engaging units (70). Therefore, the hemi-spherical portions (701) and the first housing (117) can have relative movement, and the main body (10) can have synchronous rotation along the same axis of the hemi-spherical portions (701) (as shown in FIG. 5), such that the digit wheel (22) can be faced to the designated direction even as the combination lock of the present invention is locked on the electronic device.

In one embodiment, the lock cable (12) has a ring portion to pivotally engage with the main body (10).

In another embodiment, the top end of the extending section (51) has an inclined first guiding surface (52) while the switching unit (60) comprises an inclined second guiding surface (603) at the position corresponding to the first guiding surface (52); the switching unit (60) is easily driven by the control unit (40) through the contact between the first guiding surface (52) and the second guiding surface (603).

In still another embodiment, each of the engaging arms (704) comprises an inclined side surface (705) at the outer surface thereof, and the tilt of the side surface (705) is bottom-up and outside-in (as shown in FIGS. 1 to 8).

Figure 9:
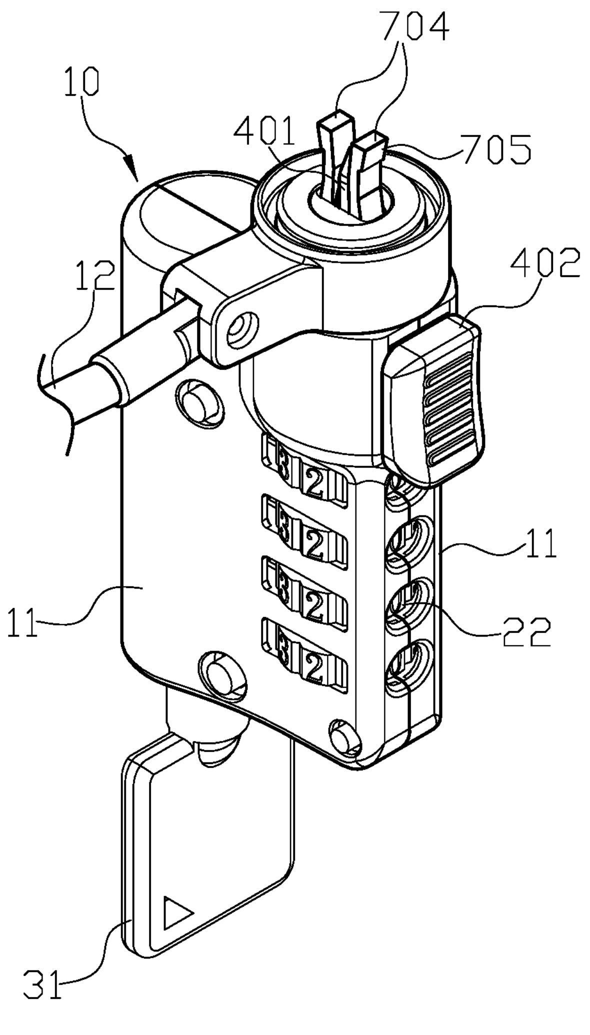
FIG. 9 is a three-dimensional assembly view of a second embodiment of the combination lock in the present invention.

In a further embodiment, each of the engaging arms (704) comprises the inclined side surface (705) at the outer surface thereof, and the tilt of the side surface (705) is top-down and outside-in (as shown in FIG. 9).

Comparing with conventional combination lock for electronic devices, the present invention is advantageous because: (i) in case of forgetting the preset code of the digit wheel (22), the user still can use the key (31) to unlock the key lock core (30); and (ii) even when the combination lock is locked on the electronic device, with the design between the hemi-spherical portions (701) of the engaging units (70) and the spherical first housing (117) of the main body (10), the hemi-spherical portions (701) and the first housing (117) can have relative movement, so that the main body (10) can have synchronous rotation along the same axis of the hemi-spherical portions (701), and the digit wheel (22) can be faced to the designated direction.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A combination lock for electronic devices comprising a main body, a digit lock core, a key lock core, a control unit, a driving block, a switching unit, and two engaging units;

wherein the main body has two halves of shells to fit together, and the digit lock core and the key lock core are installed in the shells of the main body; a first slot is formed in an upper portion of the shells at the position corresponding to the digit lock core while a second slot is formed in the upper portion of the shells at the position corresponding to the key lock core, and the first slot and the second slot are communicated through a corner portion; a locating block protrudes from an interior space of the corner portion; the first slot is adapted to laterally penetrate through the shells through an operating opening, and a spherical first housing is formed at the upper end of the first slot, and as the control unit is coupled in the main body, a top rod of the control unit is configured to upwardly protrude from the first housing; a first through hole is formed at a lower portion of the shells, and a key of the key lock core is configured to be inserted into the shells through the first through hole, and a lock cable is connected to one end of the shells;

wherein the digit lock core comprises a lock pin which is adapted to keep pressed into the first slot when not operated, and a digit wheel is disposed on the digit lock core so as to control the lock pin into the locked/unlocked position; when the code of the digit wheel matches the preset code of the digit wheel, the lock pin is adapted to be driven downwardly into the unlocked position; an upper end of the lock pin comprises an abutting board having a larger diameter than the lock pin;

wherein the key lock core has a lock rod which is configured to keep pressed into the second slot when not operated, and the lock rod is operated through the key; when unlocked by the key, the lock rod is adapted to be driven downwardly into the unlocked position;

wherein the control unit comprises a board body, and a top rod is extended from the board body, and one edge of the board body is connected to a push button; the control unit is positioned into the first slot of the shells, and the push button and the top rod are adapted to protrude from the operating opening and the first housing respectively; a first spring abutted between the first slot and the control unit is configured to keep pushing the control unit upwardly in normal condition;

wherein the driving block has an extending section formed at an upper portion thereof, and the extending section comprises a smaller diameter than that of the driving block, and the driving block is positioned into the second slot in the two shells so as to connect to the lock rod of the key lock core; when the key lock core is locked, the lock rod is protruded to drive the extending section of the driving block into the corner portion of the shells;

wherein the switching unit comprises a connecting channel at a central portion thereof, and the switching unit is disposed on the locating block through the connecting channel; a second spring is adapted to be abutted between an inner wall of the locating block and an inner wall of the connecting channel so that the second spring is configured to keep pushing the switching unit laterally in normal condition; the switching unit is configured to abut against the extending section in the corner portion so as to limit the position of the switching unit; a sliding slot is formed at a lateral side of the switching unit, and a sliding block is adapted to slidably couple with the sliding slot, and a third spring is abutted between the sliding block and the sliding slot; the sliding block is positioned between the abutting board and the control unit; and wherein the two engaging units are two halves to fit together, and each of the engaging units has a hemi-spherical portion at a lower end thereof, and the two hemi-spherical portions are put together and positioned in the first housing of the main body, and the top rod is positioned between the two hemi-spherical portions; a first annular groove is formed on the inner surface of the first housing, and each of the engaging units has at least a sliding column protruding from the hemi-spherical portion, and the sliding column is adapted to slidably move in the first annular groove so as to limit the relative position between the engaging units and the main body; each of the engaging units comprises an engaging arm at a top portion thereof, and the engaging arms are configured to protrude out of the main body; a second annular groove is formed on the surface of the main body adjacent to the opening of the first housing, and a round cover is coupled with the second annular groove; the round cover has a second through hole to allow the engaging arms to penetrate therethrough, so that, through the second annular groove, the main body is adapted to rotate relative to the round cover; when the top rod is pushed upwardly, the two engaging arms are configured to be driven and spread apart so as to achieve the locked effect.

2. The combination lock for electronic devices of claim 1, wherein the corner portion comprises a blocking edge adjacent to a lateral side of the second slot.

3. The combination lock for electronic devices of claim 1, wherein the lock cable has a ring portion to pivotally engage with the main body.

4. The combination lock for electronic devices of claim 1, wherein a top end of the extending section has an inclined first guiding surface while the switching unit comprises an inclined second guiding surface at the position corresponding to the first guiding surface.

5. The combination lock for electronic devices of claim 1, wherein the top rod has a tapered top, and each of the engaging units comprises a second housing, and the second housings are adapted to accommodate the top rod when the top rod is not pushed upwardly.

6. The combination lock for electronic devices of claim 1, wherein each of the engaging arms comprises an inclined side surface at the outer surface thereof, and the tilt of the side surface is bottom-up and outside-in.

7. The combination lock for electronic devices of claim 1, wherein each of the engaging arms comprises an inclined side surface at the outer surface thereof, and the tilt of the side surface is top-down and outside-in.

* * * * *